(12) United States Patent
Echols et al.

(10) Patent No.: US 10,613,552 B2
(45) Date of Patent: Apr. 7, 2020

(54) DRONE REMAINING UNDETECTABLE FROM CURRENT TARGET LOCATION DURING SURVEILLANCE

(71) Applicant: Lenovo (Singapore) Pte. Ltd., Singapore (SG)

(72) Inventors: Roderick Echols, Chapel Hill, NC (US); Russell S. VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 64 days.

(21) Appl. No.: 15/798,674

(22) Filed: Oct. 31, 2017

(65) Prior Publication Data

US 2019/0129450 A1 May 2, 2019

(51) Int. Cl.
| | |
|---|---|
| *G05D 1/12* | (2006.01) |
| *B64C 39/02* | (2006.01) |
| *G05D 1/00* | (2006.01) |
| *G08G 5/00* | (2006.01) |
| *G08G 5/02* | (2006.01) |

(52) U.S. Cl.
CPC .............. *G05D 1/12* (2013.01); *B64C 39/024* (2013.01); *G05D 1/0094* (2013.01); *B64C 2201/127* (2013.01); *B64C 2201/141* (2013.01); *B64C 2201/18* (2013.01); *G08G 5/0069* (2013.01); *G08G 5/0086* (2013.01); *G08G 5/0091* (2013.01); *G08G 5/025* (2013.01)

(58) Field of Classification Search
CPC . G06T 2207/30196; G06T 2207/30232; G06T 2207/248; G06T 2207/10032; G06T 2207/10016; G06T 2207/10028; G06T 2207/30241; G06T 17/05; G06T 17/60
See application file for complete search history.

(56) References Cited

U.S. PATENT DOCUMENTS

2014/0061478 A1* 3/2014 Hiebl ................... F41H 13/00
250/342
2017/0123425 A1* 5/2017 Zhao .................... G05D 1/102

* cited by examiner

*Primary Examiner* — Mahmoud S Ismail
*Assistant Examiner* — Bakari Underwood
(74) *Attorney, Agent, or Firm* — VanLeeuwen & VanLeeuwen; Jason A. Friday

(57) ABSTRACT

An approach is provided that identifies a current position of a drone. The approach further detects a current target location and determines a surveillance position with the surveillance position being predicted to be undetectable from the current target location. The approach then instructs the drone to move from the current position to the surveillance position.

17 Claims, 6 Drawing Sheets

DRONE REMAINING UNDETECTABLE FROM CURRENT TARGET LOCATION DURING SURVEILLANCE

BACKGROUND

Description of Related Art

Unmanned drones are devices that fly at the direction of a, typically, ground-based operator. Often used for surveillance with use of video capturing accessories, such as digital video cameras, that transmit the images captured by the drone back to the ground-based operator either in real time, or in some cases, the images are stored on board the drone and retrieved when the drone returns to the operator.

For proper surveillance, a drone usually needs to remain unseen. However, the ground-based operator is often uninformed regarding counter-surveillance efforts being taken by the target of the surveillance. Counter-surveillance efforts can include technology used to detect drones as well as human operators, such as sentries or guards, using binoculars and other devices to spot the drones visually as well as listening devices used to attempt to hear the drones' rotors while flying in the air near the target location.

SUMMARY

An approach is provided that identifies a current position of a drone. The approach further detects a current target location and determines a surveillance position with the surveillance position being predicted to be undetectable from the current target location. The approach then instructs the drone to move from the current position to the surveillance position.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
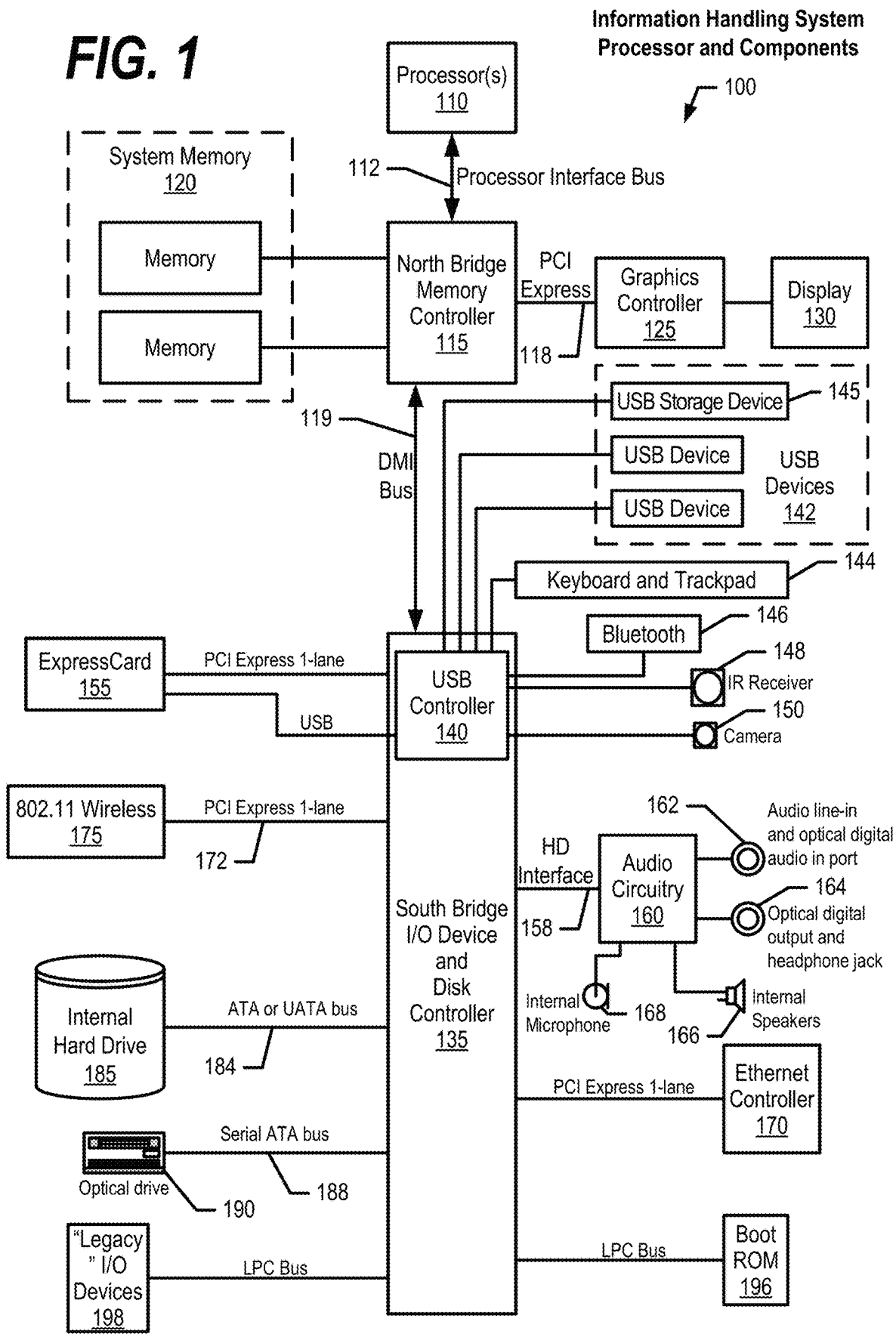
FIG. 1 depicts a block diagram of a network of data processing systems in which illustrative embodiments may be implemented.

FIG. 3-6 depict an approach of drone detection avoidance. The approach described herein allows a to dynamically calculate the distance between the drone and counter-surveillance efforts found at the target location to detect the drone's presence in the area. The approach also detects the angle between the drone and the target. The approach further accounts for lighting, size, and other environmental factors that are relevant. Surveillance devices are becoming microsized to the point where they can approach a person without being seen. Such devices need to be close enough to see and hear what they are monitoring without being detected. Even an extremely small drone can be seen by the naked eye when it gets close enough to a person being monitored.

When the drone detects that it is in a position, or is moving towards a position, where there is a higher probability of detection, the approach provides for evasive actions at the drone, such as moving further away or at an angle where detection is less likely.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
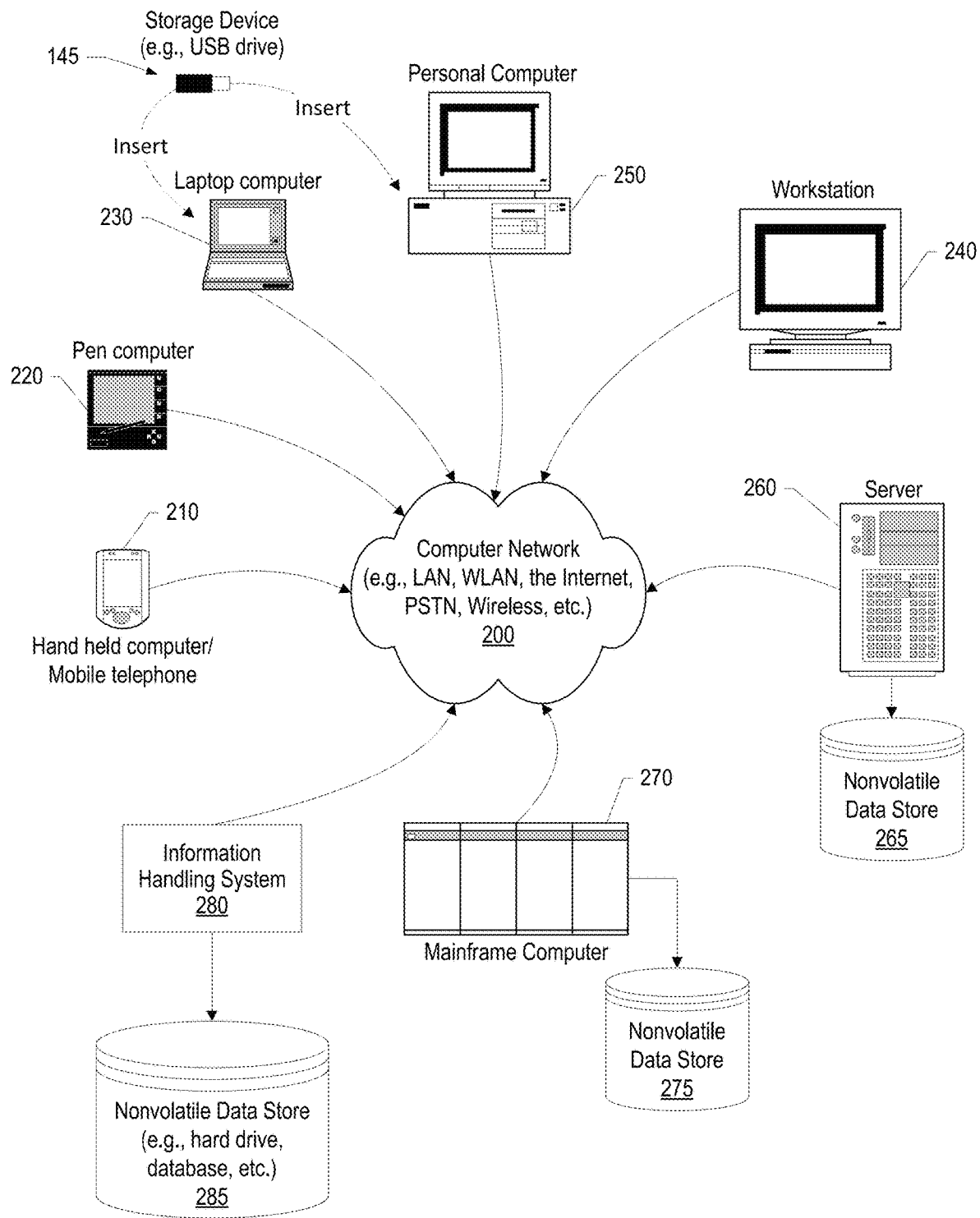
FIG. 2 depicts a block diagram of a data processing system in which illustrative embodiments may be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
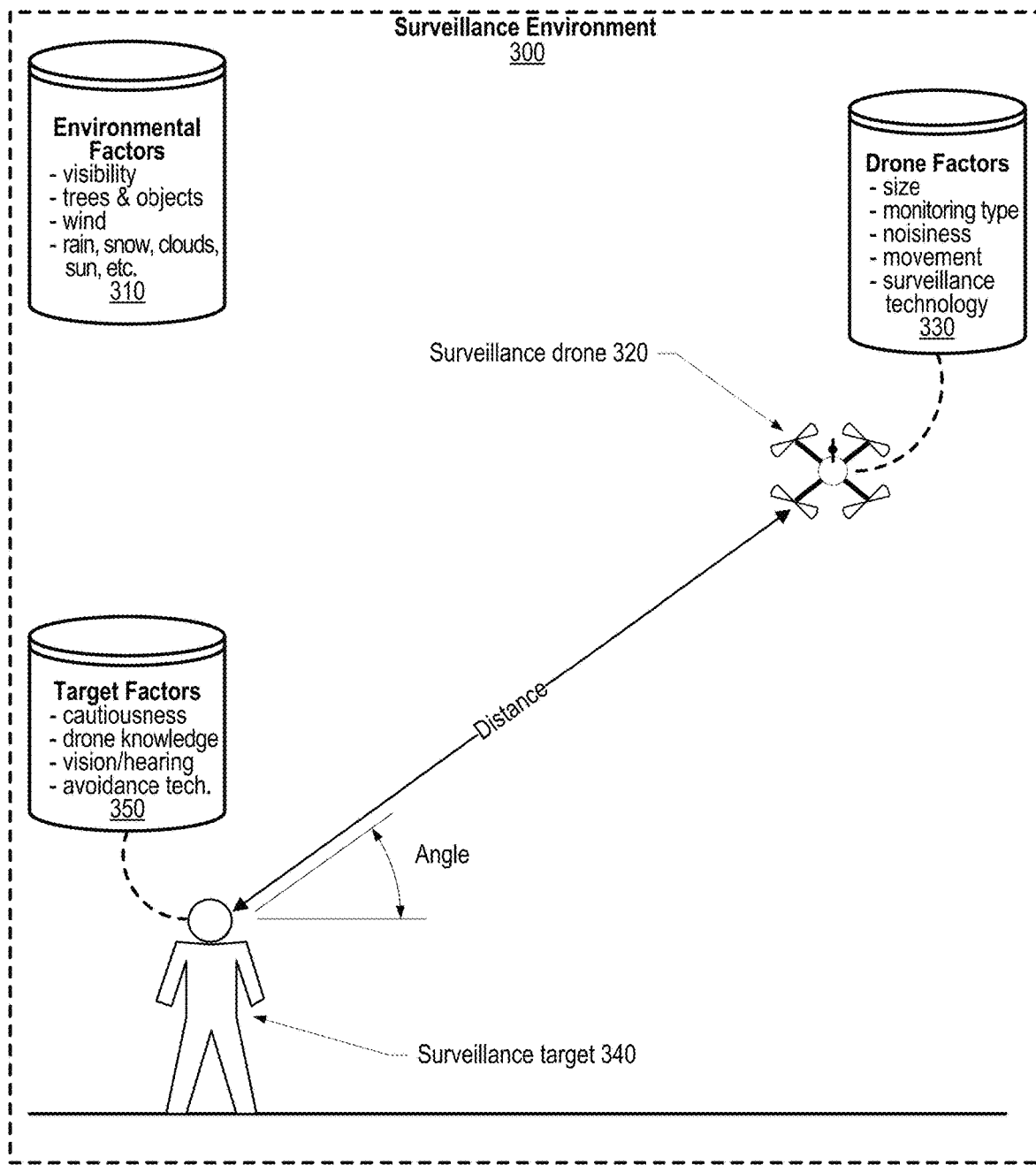
FIG. 3 depicts a system diagram showing the various components used in detecting drone proximity and visibility.

FIG. 3 depicts a system diagram showing the various components used in detecting drone proximity and visibility. Surveillance environment 300 is also known as a target location where surveillance target 340 is currently located. Surveillance drone 320 is deployed to capture data about surveillance target 340 such as the target's exact location, actions being performed by the target (captured by digital video and/or digital cameras on-board drone 320), and perhaps what is being said by target 320 (captured by sensitive microphones on-board drone 320). Before and during deployment of drone 320, a variety of factors are collected and used to determine the distance and angle that drone 320 is to be positioned from target 340 to avoid detection of the drone by the target or by sentries used by the target. Sentries can include both human-based sentries, such as guards or security personnel, as well as electronic sentries designed to detect nearby drones, personnel, or other devices that might be deployed to provide surveillance of target 340.

The factors that are collected include environmental factors 310, drone factors 330, and target factors 350. Environmental factors 310 can include visibility data pertaining to current visibility conditions at target location 300, trees and other physical objects that might be used to obscure drone 320 from being spotted by the target, weather conditions such as wind conditions, rain, snow, clouds, sun position, and the like. Environmental factors 310 can be gathered before deployment of drone 320, such collected by orbiting weather and other types of satellites. In addition, drone 320 can collect and revise environmental factor data when the drone reaches target location 300.

Drone factors 330 are factors pertaining to drone 320 that is being deployed. These factors can largely be collected before deployment of the drone. Drone factors 330 can include the physical size and shape of the drone, the monitoring type of the drone (visual surveillance only, visual and audio surveillance, etc.). Drone factors also include the noisiness of the drone when in operation to account for how audible the drone's rotors and other components included in the drone are during operation. Drone factors also include movement capabilities of the drone including altitude ceiling of the drone, speed of the drone, and landing capabilities such as the types of surfaces (grassy, rocky, water, etc.) onto which the drone is capable of landing. Drone factors 330 also include the surveillance technology included in the drone, such as the magnification capabilities of digital cameras and video equipment on the drone, listening capabilities of digital microphones on the drone, and any other surveillance technology included on the drone.

Utilizing environmental factors data 310, drone factors data 330, and target factors data 350 enables the system to calculate the distance from target 340 and the angle from target 340 to which the drone can safely be positioned while being reasonably assured that the drone will not be detected by target 340 or by sentries utilized by target 340.

Figure 4:
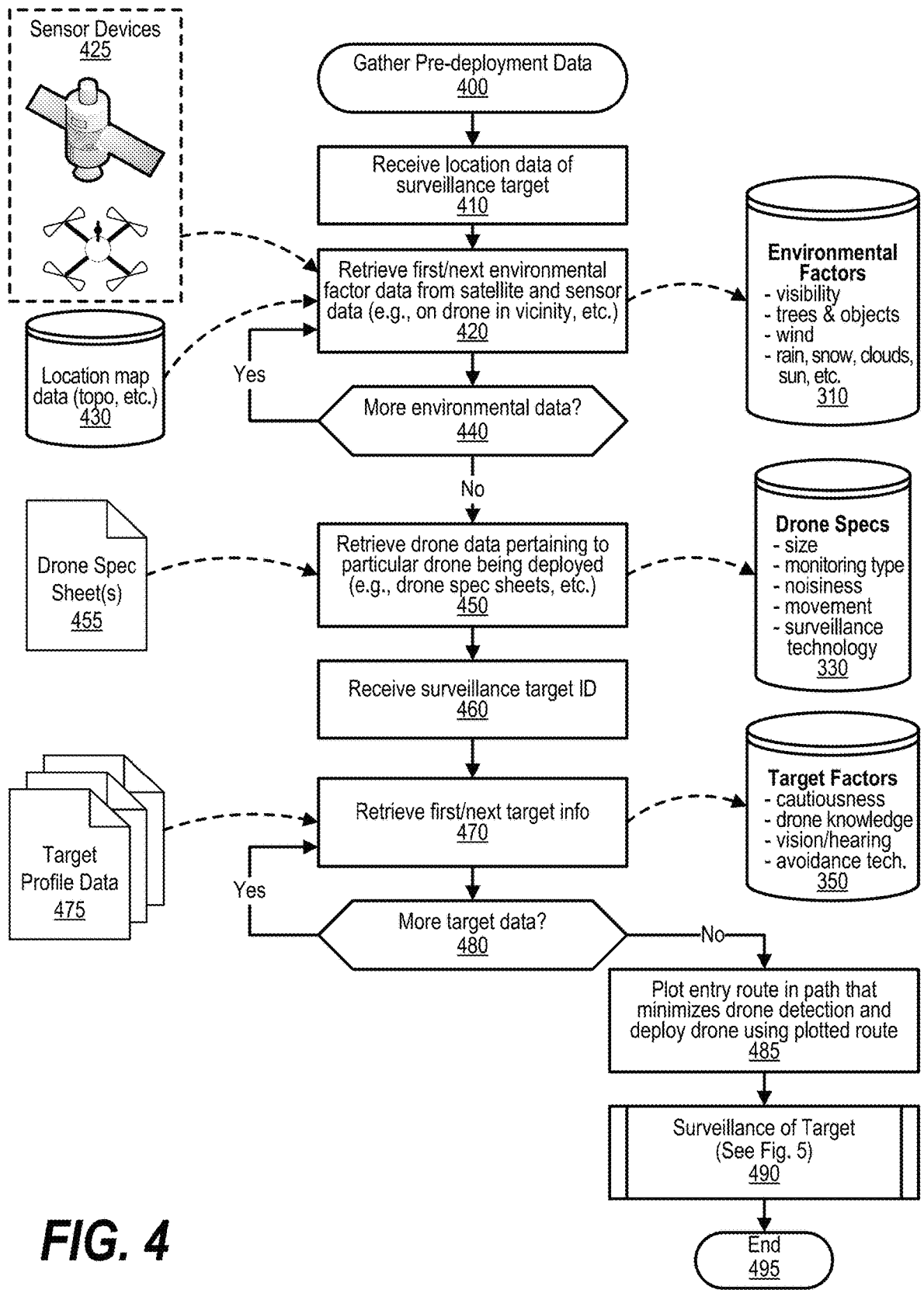
FIG. 4 depicts a flowchart of a process that gathers data prior to deploying the drone to the target location.

FIG. 4 depicts a flowchart of a process that gathers data prior to deploying the drone to the target location. FIG. 4 processing commences at 400 and shows the steps taken by a process that gathers data prior to deploying the drone to the target location. At step 410, the process receives location data of surveillance target. At step 420, the process retrieves the first environmental factor data from satellite and sensor data 425. Environmental data can also be gathered from previously gathered location data 430, such as from topographical maps of the target location, previously gathered photographs of the target location, etc. The process determines as to whether more environmental data is to be gathered before deploying the drone (decision 440). If more environmental data is to be gathered before deploying the drone, then decision 440 branches to the 'yes' branch which loops back to step 420 to continue gathering environmental factor data. This looping continues until no more environmental data is needed before drone deployment, at which point decision 440 branches to the 'no' branch exiting the loop. At step 450, the process retrieves drone data that pertains to particular drone being deployed, such as the drone's make and model. This data can be gathered from sources such as drone spec sheets 455. At step 460, the process receives the surveillance target identifier from the operator with the identifier identifying the person on which surveillance is being performed. This might include the individual's name, position, country or military affiliation, organization, and the like. At step 470, the process retrieves the first set of target information pertaining to the individual identified at step 460. Target factor data can be collected from target profiles gathered by intelligence personnel as well as from network sources, such as social media sources and other publicly available sources that might be found on the Internet. The process determines as to whether more target data is being gathered about the particular target (decision 480). If more target data is being gathered about the particular target, then decision 480 branches to the 'yes' branch which loops back to step 470 to gather the next set of target factor data. This looping continues until no more target factor data is being collected, at which point decision 480 branches to the 'no' branch exiting the loop. At step 485, the process plots an entry route for the drone to follow with the entry route being a path that minimizes drone detection and deploys the drone in the target location using the plotted route. At predefined process 490, the process performs the Surveillance of Target routine (see FIG. 5 and corresponding text for processing details). FIG. 4 processing thereafter ends at 495.

Figure 5:
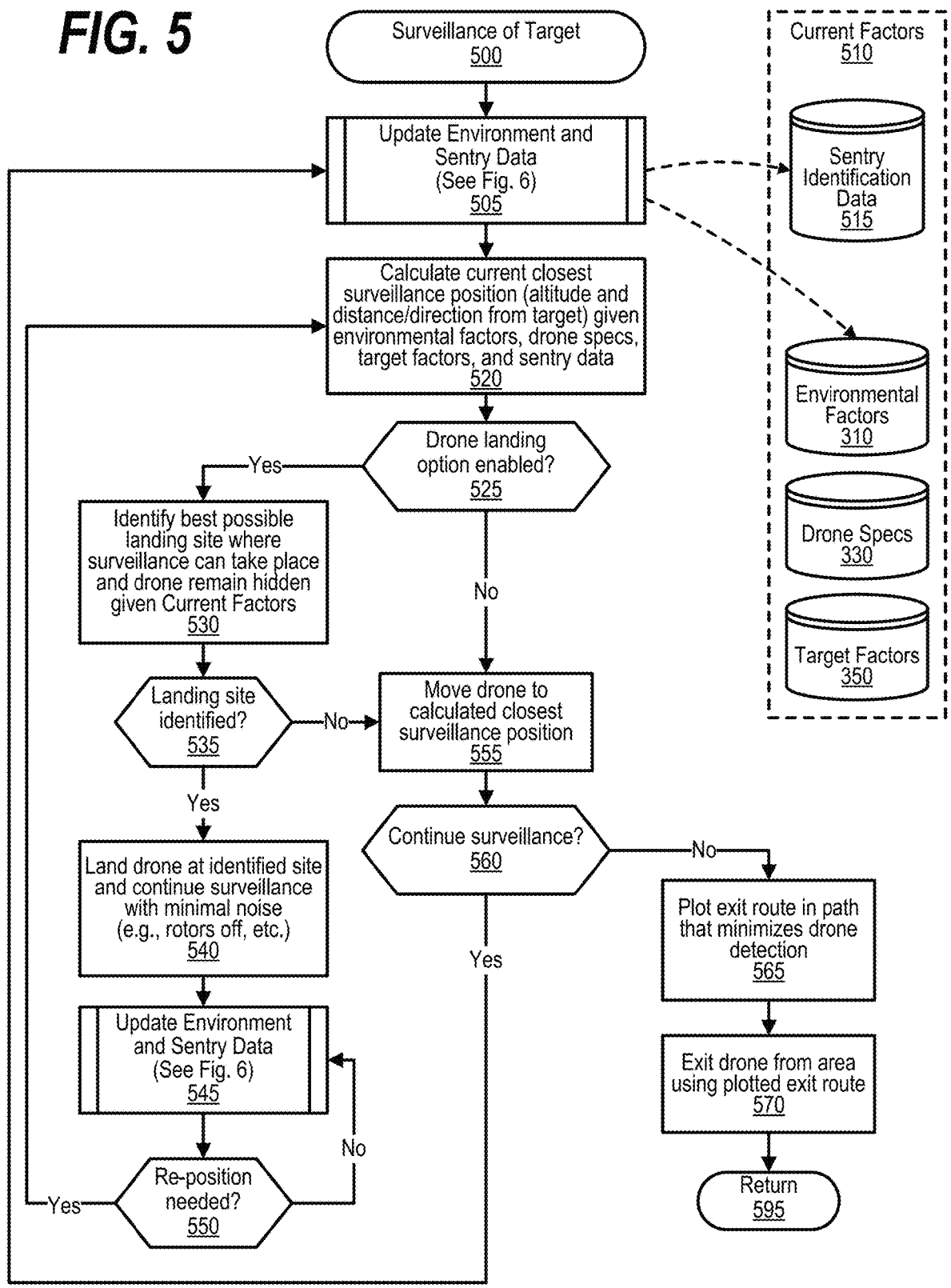
FIG. 5 depicts a flowchart of a process that is performed during surveillance of the target location.

FIG. 5 depicts a flowchart of a process that is performed during surveillance of the target location. FIG. 5 processing commences at 500 and shows the steps taken by a process that surveillance of Target. At predefined process 505, the process performs the Update Environment and Sentry Data routine (see FIG. 6 and corresponding text for processing details). Current factors data set 510 is used to determine the distance and angle of the drone to be positioned with predefined process 505 updating sentry identification data store 515 and environmental factors data store 310. At step 520, the process calculates the current closest surveillance position (altitude and distance/direction from target) given the environmental factors, drone specs, target factors, and sentry data that are retrieved from current factors data set 510. The process determines as to whether drone landing option enabled (decision 525). If landing the drone is an option that has been enabled for the surveillance, then decision 525 branches to the 'yes' branch to perform steps 530 through 550. On the other hand, if the drone landing option has not been enabled, then decision 525 branches to the 'no' branch to perform step 555 whereup an instruction is sent to the drone to fly to the closest surveillance position that has been determined to not reveal the drone's whereabouts to the target. If drone landing is an option, then steps 530 through 550 are performed. At step 530, the process identifies the best possible landing site where surveillance can take place and the drone will remain hidden given the data in Current Factors data set 510. The process determines as to whether a landing site has been identified (decision 535). If a landing site has been identified, then decision 535 branches to the 'yes' branch to process steps 540 through 550 that land the drone and continue to collect data pertaining to the target. On the other hand, if a landing site cannot be identified, then decision 535 branches to the 'no' branch whereupon step 555 is performed to fly the drone to a position calculated to keep the drone hidden while continuing surveillance of the target. At step 540, the process lands the drone at the identified site and continues surveillance of the target with minimal noise (e.g., rotors turned off, etc.). At predefined process 545, the process performs the Update Environment and Sentry Data routine (see FIG. 6 and corresponding text for processing details). As previously described, this process updates data found in current factors data set 510. The process determines whether surveillance of the target is continuing (decision 560). If surveillance of the target is continuing, then decision 560 branches to the 'yes' branch which loops back to predefined process 505 and perform the operations described above to continue moving the drone to positions where the drone will remain hidden from the target, yet be close enough to capture surveillance data with the drone's surveillance technology. This looping continues until surveillance of the target is terminated, at which point decision 560 branches to the 'no' branch exiting the loop and performing steps to extract the drone from the target location. At step 565, the process plots an exit route for the drone to take with the exit route following a path that minimizes drone detection by the target. At step 570, the process transmits an instruction to the drone to have the drone exit from area using plotted exit route. FIG. 5 processing thereafter returns to the calling routine (see FIG. 4) at 595.

Figure 6:
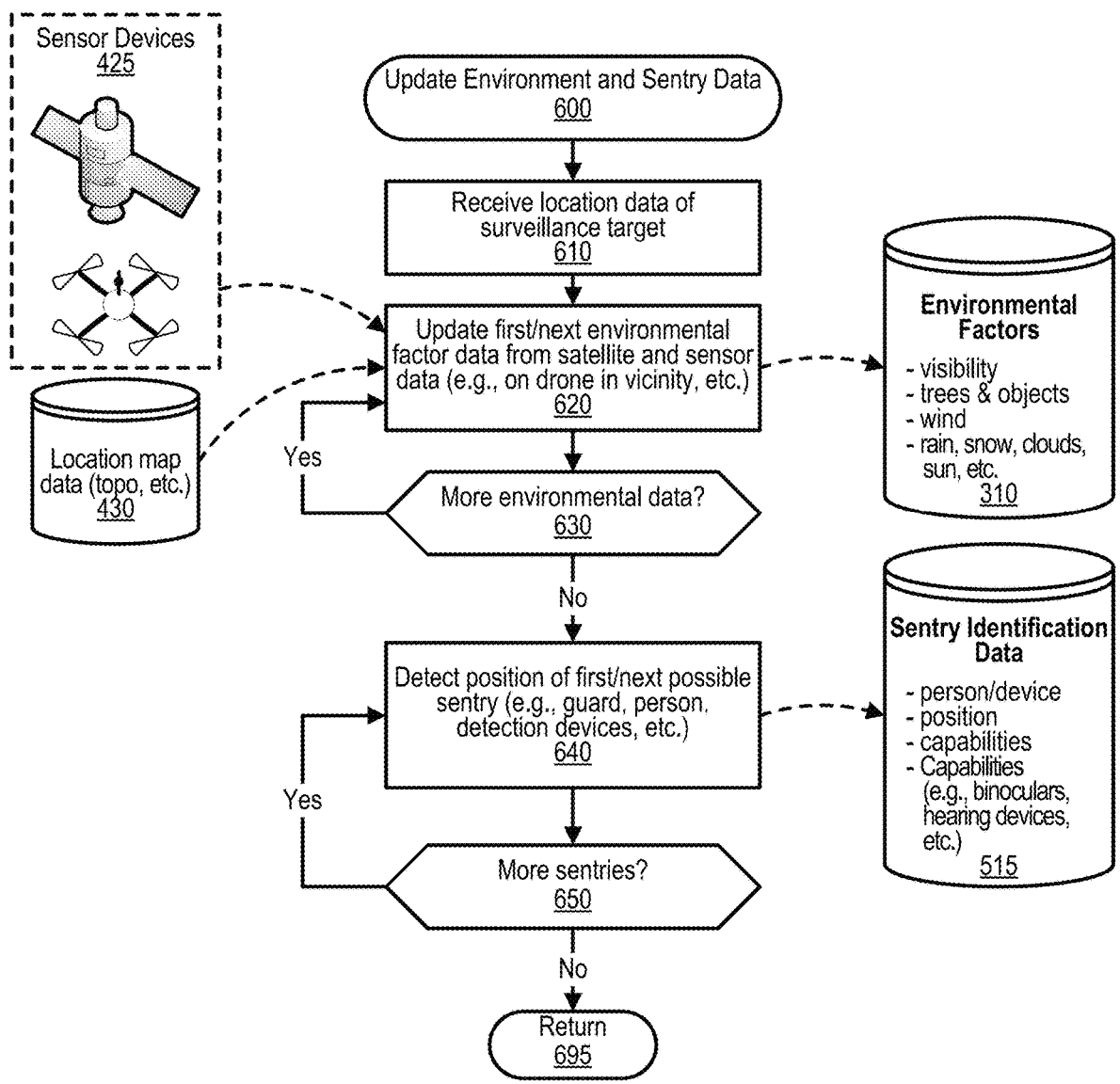
FIG. 6 depicts a flowchart of a process that updates environment and sentry data during deployment of the drone at the target location.

FIG. 6 depicts a flowchart of a process that updates environment and sentry data during deployment of the drone at the target location. FIG. 6 processing commences at 600 and shows the steps taken by a process that update Environment and Sentry Data. At step 610, the process receives location data pertaining to the surveillance target. At step 620, the process updates the first environmental factor data from satellite and sensor data (e.g., on drone in vicinity, etc.). This data can be current data received from sensors 425, such as on orbiting satellites data from drones, as well as from location data, such as topographical map data and photograph data previously taken of the targets current location. Step 620 updates environmental factors data store 310 that is used by the drone handling process shown in FIG. 5. The process determines as to whether more environmental data is being captured (decision 630). If more environmental data is being captured, then decision 630 branches to the 'yes' branch which loops back to step 620 to continue gathering environmental factors data. This looping continues until no more environmental factors data is being gathered or updated, at which point decision 630 branches to the 'no' branch exiting the loop. At step 640, the process detects position of the first possible sentry (e.g., guard, person, detection devices, etc.) in the target location. Sentry detection can be performed using sensors, such as digital cameras, included on the deployed drone. Step 640 updates the sentry identification data stored in data store 515. The sentry identification data is used to calculate any updates to the drone's current position to continue hiding the drone's presence from the target and the sentries while continuing to gather surveillance data pertaining to the target. The process determines as to whether more sentries are detected (decision 650). If more sentries are detected, then decision 650 branches to the 'yes' branch which loops back to step 640 to continue updating the sentry identification data stored in data store 515. This looping continues until no more sentries are detected, at which point decision 650 branches to the 'no' branch exiting the loop. FIG. 6 processing thereafter returns to the calling routine (see FIG. 5) at 695.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:
   identifying a current position of a drone;
   detecting a current target location;
   determining a surveillance position, wherein the surveillance position is determined to be undetectable;
   instructing the drone to move from the current position to the surveillance position;
   terminating surveillance of the target location after the drone has moved to the surveillance position;
   calculating an exit route of the drone, wherein the exit route is plotted to minimize drone detection; and
   instructing the drone to move from the surveillance position along the exit route.

2. The method of claim 1 further comprising:
   identifying a suitable drone landing location, wherein the suitable drone landing location is predicted to be undetectable from the target location; and
   instructing the drone to land at the identified landing location.

3. The method of claim 1 further comprising:
   prior to deploying the drone:
      identifying a set of environmental factors corresponding to the target location, wherein the environmental factor includes a visibility rating, a wind rating, and data regarding a plurality of visible physical objects near the target location; and
      utilizing the environmental factors to determine the surveillance position.

4. The method of claim 1 further comprising:
   detecting a position of one or more sentries, wherein the surveillance position is determined based on the position of the drone with respect to each of the sentries.

5. The method of claim 1 further comprising:
   retrieving a set of drone specifications that correspond to the drone, wherein the drone specifications include a drone size and a drone noise rating; and
   utilizing the environmental factors to determine the surveillance position.

6. The method of claim 1 further comprising:
   retrieving a set of target factors, wherein the target factors include a target cautiousness value, a drone knowledge rating, and a sensory rating; and
   utilizing the target factors to determine the surveillance position.

7. An information handling system comprising:
   one or more processors;
   a memory coupled to at least one of the processors;
   a set of instructions stored in the memory and executed by at least one of the processors to perform actions comprising:
      identification of a current position of a drone;
      identification of a current target location;
      determination of a surveillance position, wherein the surveillance position is determined to be undetectable from the current target location;
      instructions that the drone to move from the current position to the surveillance position;
      termination of the surveillance of the target location after the drone has moved to the surveillance position;
      calculation of an exit route of the drone, wherein the exit route is plotted to minimize drone detection; and
      instructions that the drone to move from the surveillance position along the exit route.

8. The information handling system of claim 7 wherein the actions further comprise:
   identification of a suitable drone landing location, wherein the suitable drone landing location is predicted to be undetectable from the target location; and
   instructions that the drone to land at the identified landing location.

9. The information handling system of claim 7 wherein the actions further comprise:
   prior to deploying the drone:
      identification of a set of environmental factors corresponding to the target location, wherein the environmental factor includes a visibility rating, a wind rating, and data regarding a plurality of visible physical objects near the target location; and
      utilization of the environmental factors to determine the surveillance position.

10. The information handling system of claim 7 wherein the actions further comprise:
   termination of the surveillance of the target location after the drone has moved to the surveillance position;

calculation of an exit route of the drone, wherein the exit route is plotted to minimize drone detection; and instructions that the drone to move from the surveillance position along the exit route.

11. The information handling system of claim 7 wherein the actions further comprise:

retrieval of a set of drone specifications that correspond to the drone, wherein the drone specifications include a drone size and a drone noise rating; and utilization of the environmental factors to determine the surveillance position.

12. The information handling system of claim 7 wherein the actions further comprise:

retrieval of a set of target factors, wherein the target factors include a target cautiousness value, a drone knowledge rating, and a sensory rating; and utilization of the target factors to determine the surveillance position.

13. A computer program product stored in a computer readable storage medium, comprising instructions that, when executed by an information handling system, causes the information handling system to perform actions that:

identify a current position of a drone;

identify of a current target location;

determine of a surveillance position, wherein the surveillance position is determined to be undetectable from the current target location;

move the drone from the current position to the surveillance position;

termination of the surveillance of the target location after the drone has moved to the surveillance position;

calculation of an exit route of the drone, wherein the exit route is plotted to minimize drone detection; and instructions that the drone to move from the surveillance position along the exit route.

14. The computer program product of claim 13 wherein the instructions further comprise:

identification of a suitable drone landing location, wherein the suitable drone landing location is predicted to be undetectable from the target location; and instructions that the drone to land at the identified landing location.

15. The computer program product of claim 13 wherein the instructions further comprise:

prior to deploying the drone:

identification of a set of environmental factors corresponding to the target location, wherein the environmental factor includes a visibility rating, a wind rating, and data regarding a plurality of visible physical objects near the target location; and utilization of the environmental factors to determine the surveillance position.

16. The computer program product of claim 13 wherein the instructions further comprise:

detection of a position of one or more sentries, wherein the surveillance position is determined based on the position of the drone with respect to each of the sentries.

17. The computer program product of claim 13 wherein the instructions further comprise:

retrieval of a set of drone specifications that correspond to the drone, wherein the drone specifications include a drone size and a drone noise rating; and utilization of the environmental factors to determine the surveillance position.

* * * * *